June 20, 1967
D. A. OGILVIE
3,326,595
APPARATUS FOR CONVERTING A PICKUP TRUCK INTO A
SIDE COMPARTMENTED UTILITY SERVICE
TRUCK WITH FLIP-TOP CLOSURES
Filed March 5, 1965
2 Sheets-Sheet 1
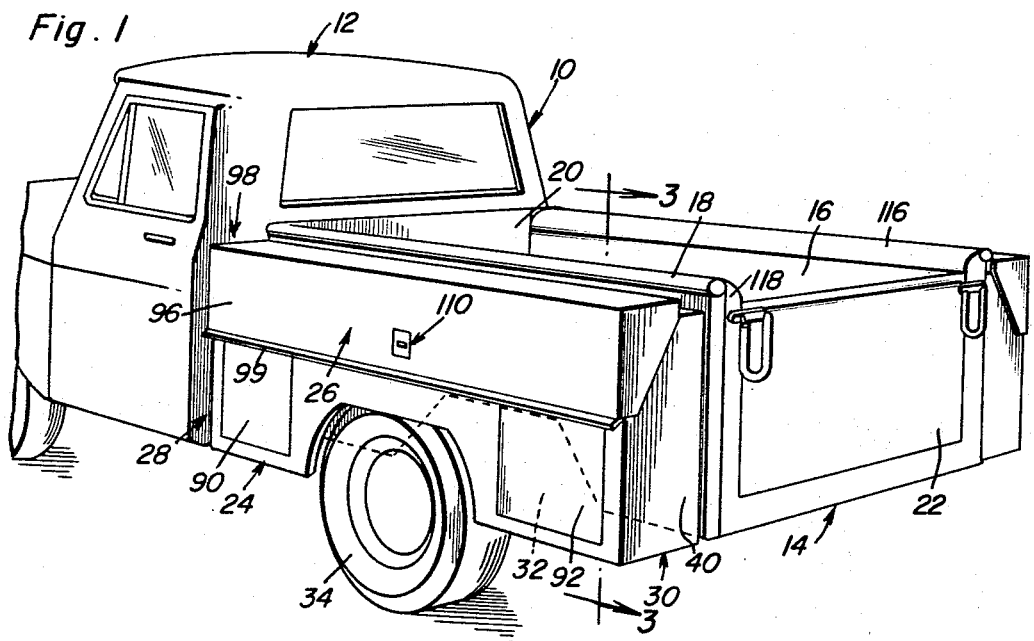
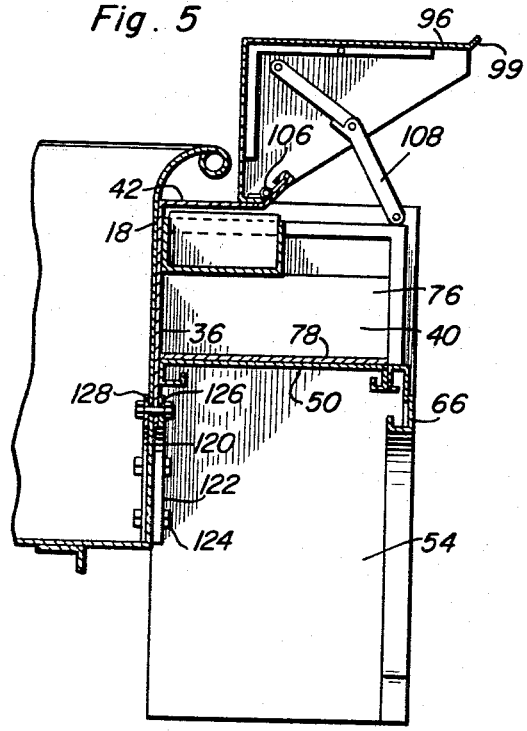
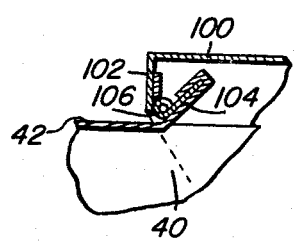
Douglas A. Ogilvie
INVENTOR.
BY *Clarence A. O'Brien*
*and Harvey B. Jackson*
Attorneys June 20, 1967           D. A. OGILVIE           3,326,595
APPARATUS FOR CONVERTING A PICKUP TRUCK INTO A
SIDE COMPARTMENTED UTILITY SERVICE
TRUCK WITH FLIP-TOP CLOSURES
Filed March 3, 1965           2 Sheets-Sheet 2
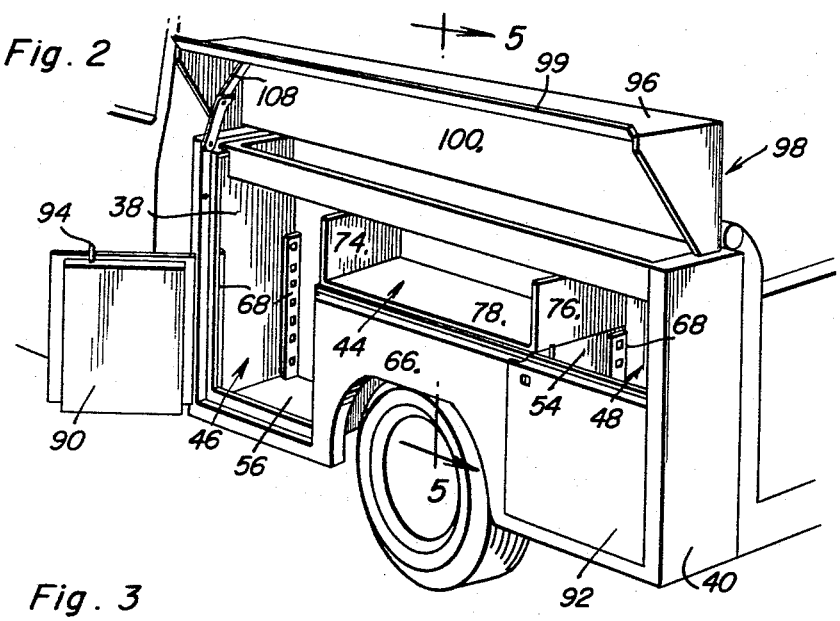
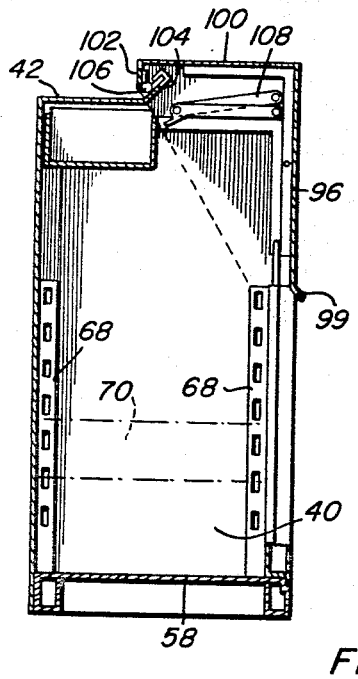
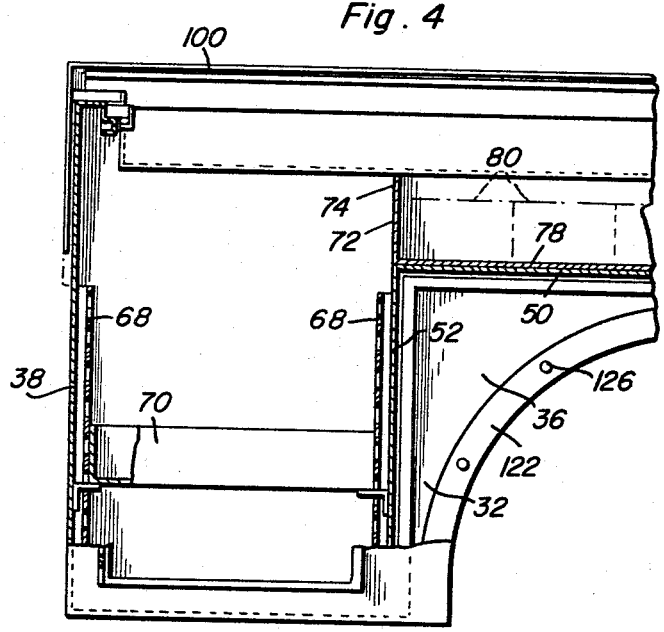
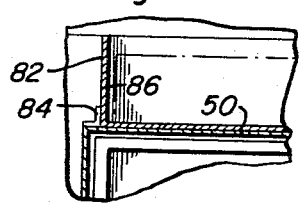
Douglas A. Ogilvie
INVENTOR.
BY *Clarence A. O'Brien*
*and Harvey B. Jacobson*
                           Attorneys

United States Patent Office 3,326,595
Patented June 20, 1967

3,326,595
APPARATUS FOR CONVERTING A PICKUP TRUCK INTO A SIDE COMPARTMENTED UTILITY SERVICE TRUCK WITH FLIP-TOP CLOSURES
Douglas A. Ogilvie, Appleton, Wis., assignor to Pierce Auto Body Works, Inc., a corporation of Wisconsin
Filed Mar. 3, 1965, Ser. No. 436,744
6 Claims. (Cl. 296—37)

This invention relates to a novel and useful assembly which may be utilized to convert an external fender or stepside-type of pickup truck into a side compartmented utility service truck with flip-top closures.

An external fender or stepside-type of pickup truck load body is that type of load body which includes substantially straight side-wall portions free of inwardly deflected portions defining a wheel well for the corresponding rear wheel of the associated pickup truck. A stepside load body has its side walls received between the rear wheels of the associated pickup truck and includes a pair of opposite side and outwardly projecting fenders which define downwardly opening wheel wells for receiving the rearwheels of the associated pickup truck. The stepside-type of pickup truck is distinguished from the internal fender or fleetside-type of pickup truck load body in that the latter has its side walls disposed outwardly of or in at least substantially the same planes in which the rear wheels of the truck are disposed. In order to provide wheel wells for receiving the rear wheels of the truck, the fleetside-type of load body includes inwardly directed bulbous portions defining downwardly and outwardly opening wheel wells and the load body of a fleetside-type of pickup truck is therefore of greater internal width and free of outwardly projecting fenders.

Inasmuch as a stepside-type of pickup truck load body, without its oppositely and outwardly projecting fenders, is narrower than the maximum width of the pickup truck disposed forwardly of the stepside-type of load body, considerable width may be added to each side of the stepside-type of load body without increasing the maximum overall width of the associated truck.

It is therefore the primary object of this invention to provide an apparatus for converting a stepside-type of pickup truck into a utility service truck by the addition of a pair of opposite side upright and horizontally elongated compartment housings to opposite sides of the stepside-type of load body in lieu of the conventional outwardly projecting rear fenders thereof and which housings include flip-top closures.

A further object of this invention, in accordance with the immediately preceding object, is to provide the aforementioned upright and horizontally elongated side compartment housing with means for defining downwardly and outwardly opening fender wells for receiving the rear wheels of the associated pickup truck.

Yet another object of this invention is to provide a pair of the aforementioned upright and horizontally elongated side compartment housings constructed in a manner whereby they will readily adapt themselves to securement to the corresponding side walls of the associated stepside-type of load body in lieu of the conventional correspondingly outwardly projecting rear fenders thereof.

Yet another object of this invention is to provide the aforementioned upright and horizontally elongated side compartment housings with longitudinally extending upper compartments including swingable "flip-top" closures including partial top wall sections and depending side wall sections whereby the upper compartments of the compartment housings afford access thereto from the top as well as from the side.

Still another object of this invention is to provide each of the horizontally elongated side compartment housings with a plurality of individual compartments each provided with a separate closure door and with means on one of the closure doors that will automatically retain the other closure doors in closed positions and with the one closure door provided with suitable lock means.

An ancillary object of this invention is to provide the aforementioned horizontally elongated side compartment housing with basic individual compartments constructed in a manner whereby the individual compartments may be readily modified so as to be specifically adapted to store and support a particular type of article.

A final object of this invention to be specifically enumerated herein is to provide a pair of upstanding horizontally elongated side compartment housings for converting a stepside-type of pickup truck load body into a utility service-type of truck and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein, like numerals refer to like parts throughout, and in which;

FIGURE 1 is a perspective view of a conventional form of stepside-type of pickup truck including a narrow load body to which a pair of the upright and horizontally elongated side compartment housings of the instant invention have been secured in lieu of the rear fenders thereof, so as to convert the pickup truck into a utility service-type of pickup truck;

FIGURE 2 is a fragmentary perspective view of the rear quarter portion of a pickup truck illustrated in FIGURE 2 on somewhat of an enlarged scale and shown with two of the three compartment closure members in the open positions;

FIGURE 3 is an enlarged transverse vertical sectional view taken substantially upon a plane taken substantially upon the section line 3—3 of FIGURE 1;

FIGURE 4 is a fragmentary side elevational view of the forward end of the upright and horizontally elongated side compartment housing with parts thereof being broken away and shown in vertical longitudinal section;

FIGURE 5 is somewhat enlarged vertical transverse sectional view taken substantially upon a plane indicated by section line 5—5 of FIGURE 2;

FIGURE 6 is a fragmentary enlarged transverse vertical sectional view showing the details of construction of the hinge construction securing the upper swingable closure member to the partial top wall of the compartment housing; and FIGURE 7 is a fragmentary longitudinal vertical sectional view showing the manner in which the upper center compartment of the side compartment housing may be modified so as to removably receive a tray assembly which itself may be modified so as to provide the desired number and shapes and sizes of sub-compartments.

Referring now more specifically to the drawings, the numeral 10 generally designates a stepside-type of pickup truck which includes a cab portion generally referred to by the reference numeral 12 and a load body generally referred to by the reference numeral 14. The load body 14 includes a pair of opposite side walls 16 and 18 which are interconnected at their forward ends by means of an upstanding and transversely extending front wall 20. The rear ends of the side walls 16 and 18 are interconnected by means of a swingable tailgate member 22. The instant invention comprises a pair of upright and horizontally elongated side compartment housings each generally referred to by reference numeral 26 and front and rear depending end sections generally referred to by the reference numerals 28 and 30. The front and rear depending end sections 28 and 30 are spaced longitudinally of each of the compartment housings 24 and define therebetween a downwardly and outwardly opening wheel well 32 for receiving the corresponding rear wheel 34 of the truck 12.

The truck 12 is of the type including a stepside-type of load body which is narrower than a fleetside-type of load body. The stepside-type of load body 14 is conventionally provided with outwardly projecting external fenders for defining the wheel wells 32 in lieu of the housing 24 and these fenders are secured to the outer surfaces of the side walls 16 and 18 in a manner similar to the manner in which the housings are secured to the outer surfaces of the side walls 16 and 18 and which will be set forth more fully hereinafter. The fleetside-type of load body above referred to is considerably wider and its side walls include inwardly projecting downwardly and outwardy opening bulbous portions which define wheel wells adapted to receive the wheels 34. Therefore, it may be seen that the narrow load bed 14 may have a pair of the housings 24 secured to the outer surfaces of the opposite side walls thereof without increasing the maximum width of the truck 10 beyond the widest portion of the cab portion 12. Accordingly, the addition of the housings 24 to the outer surfaces of the side walls 16 and 18 results in a composite load body of a width substantially the same as a conventional type of fleetside-type of load body.

Each of the housings 24 includes an upstanding inner wall 36, a front wall 38, a rear wall 40, and an inner partial top wall 42. In addition, each of the housings defines an upper horizontally elongated center section 44 interconnecting the front and rear depending opposite end sections generally referred to by the reference numerals 46 and 48. The bottom of the center section 44 is defined by a horizontal member 50 extending between a pair of depending partitions 52 and 54 defining the rear and forward limits of the front and rear depending sections 46 and 48. The lower ends of the front and rear sections 46 and 48 are closed by means of bottoms 56 and 58 and the various walls, members, partitions, bottoms and the partial top wall 42 are interconnected in any convenient manner. In addition, a facing panel 60 is secured between the partitions 52 and 54 and the bottom 50 to partially enclose the upper portion of the wheel well 32 defined by the partitions 52 and 54 and the bottom 50.

Each of the depending end sections 46 and 48 includes a plurality of upstanding corner shelf-supporting members 68 with which vertically adjustable shelf members such as shelf member 70 may be removably engaged. In addition, a generally U-shaped semi-compartment forming member 72 including upstanding end walls 74 and 76 interconnected at their lower ends by means of a bottom wall 78 may be secured to the bottom 50 in any convenient manner (not shown) and have removable upwardly opening compartment forming members 80 disposed therein. Still further, the U-shaped member 72 may be replaced by a similar but removable generally U-shaped member 82 such as that illustrated in FIGURE 7 of the drawings and held in position on the bottom 50 by means of opposite end abutment members 84 secured to the bottom 50 and engaging the opposite end walls 86 of the U-shaped member 82.

The lower portions of the depending end sections 46 and 48 are closed by means of hinged horizontally swingable door asemblies 90 and 92 respectively, and each of the door asesmblies 90 and 92 includes an upstanding lug 94 for disopsition behind the depending outer partial side wall portion 96 of a swingable closure generally referred to by the reference numeral 98 for the upper center compartment 44. The depending outer side wall portion 96 is carried by the outer marginal edge portion of an outer partial top wall section 100 whose inner marginal edge portion includes a downturned flange 102 which is pivotally secured to an upturned outer flange portion 104 carried by the outer extremity of the inner partial top wall 42. A piano-type hinge assembly 106 is utilized to pivitally secure the flanges 102 and 104 together and it may be seen that the flange or flange portion 102 abuts the portion of the inner partial top well 42 disposed immediately inwardly of the flange 104 when the swingable cover or top 98 is in the open position illustrated in FIGURE 5 of the drawings.

Suitable articulated bracing means 108 may be pivottally secured to the front wall 38 and the corresponding end of the swingable top or cover 98 releasably supporting the latter in its open position illustrated in FIGURE 3 of the drawings. The upturned flange 104 defines a water seal to prevent water from seeping into the upper center compartment 44 and the lower marginal edge portion of the partial side wall 96 is outturned as at 99 to also form a drip lip to prevent moisture from entering the upper ends of the depending opposite end compartments 46 and 48. Still further, the lower marginal edge portion of the partial front wall 96 is engageable with the upstanding projections or lugs 94 carried by the doors or closure members 90 and 92 to prevent the latter from being opened from a closed position whenever the top or cover 98 is in the closed position. In addition, the top or cover 98 is provided with a locking mechanism generally referred to by the reference numeral 110 for the purpose of locking the cover 98 in the closed position.

With attention now invited to FIGURES 5 and 6 of the drawings it may be seen that the upturned flange portion 104 is disposed below the outer marginal partial top wall 100 in view of the depending flange by which the partial top wall 100 is secured to the hinge assembly 106. Further, it may be seen that the upper marginal edge portions of the opposite side walls 16 and 18 of the load bed 14 are outwardly flared as at 116 and 118 and that these outwardly flared portions overlie the stationary inner marginal top wall portions 42. Still further, the covers or tops 98 of the housing 24 are disposed entirely outwardly of the outwardly flared portions 116 and 118 even when the covers or tops 98 are in the open positions.

The side walls 86 of the housing 24 include generally arcuate edge portions 120 which are reinforced as at 122 and are secured to the side walls 16 and 18 in any convenient manner such as by fasteners 124 passed through aligned bores 126 and 128 formed in the side walls 36 and 16 and 18. Conventionally, the same fasteners 124 are utilized to secure a conventional outwardly projecting fenders to the outer surfaces of the side walls 16 and 18 and accordingly, it may be seen that the housings 24 are secured to the outer surface of the opposite side walls 16 and 18 in lieu of the conventional outwardly projecting fenders so as to modify the conventional load bed of the step-side-type in order to provide a utility service-type of pickup truck.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conventional pickup truck load body of the stepside-type including upstanding longitudinal sides from which the conventional corresponding rear fenders have been removed, a body construction adapted to be used in pairs for converting the fenderless load body into a utility service-type of body, said body construction comprising an upright and horizontally elongated side compartment housing secured to the corresponding upstanding side of said load body in lieu of the conventional corresponding outwardly projecting rear fender thereof, said housing, in side elevation, including an upper horizontally elongated center section interconnecting a pair of spaced opposite end depending end sections defining a downwardly opening wheel well therebetween for said load body and whose upper end is closed by the portion of said center section extending between said end sections, said housing including an inner side wall fully enclosing the inner extremities of said center and end sections and including portions projecting into said well, said load body sides including reinforced portions adapted to have said fenders secured thereto, and said housing side wall portions including means registrable with and adapted to be secured to the corresponding reinforced portions by means of fasteners comprising at least the major means of supporting said housings from the corresponding side, said corresponding side including an outwardly flared upper terminal edge portion projecting above and over said housing, said housing including at least an inner marginal and longitudinally extending partial top wall below and projecting outwardly of said outwardly flared upper terminal edge portion, said housing also including an outer marginal and longitudinally extending partial top wall whose inner marginal edge portion is pivotally secured to the outer marginal edge portion of said inner partial top wall for rotation about an axis generally paralleling said outer and inner edge portions and pivotal movement of said outer partial top wall from a closed position forming a continuation of said inner partial top wall and an outwardly and upwardly inclined position opening at least the upper portion of said center section.

2. The combination of claim 1 wherein said inner partial top wall terminates outwardly in an upwardly directed flange, said outer marginal top wall terminating inwardly in a downturned flange, a hinge assembly pivotally securing the free edge portion of said downturned flange to the base edge portion of said upwardly directed flange with the latter disposed outwardly of said downturned flange.

3. The combination of claim 1 wherein each of said depending end sections opens outwardly and is provided with swingable closure members.

4. The combination of claim 1 wherein said center section opens upwardly and outwardly and is provided with a swingable closure member.

5. The combination of claim 1 wherein each of said depending end sections opens outwardly and is provided with swingable closure members, said swingable closure members for said end and center sections including coacting means preventing opening of the closure members for said end sections while the closure member for said center section is closed.

6. The combination of claim 5 wherein said closure member for said center section includes lock means cooperable with other portions of said housing for releasably locking said center section closure member in the closed position.

References Cited
UNITED STATES PATENTS 2,722,352 11/1955 Dehnel _____ 296—37
3,245,713 4/1966 Ogilvie _____ 296—24

BENJAMIN HERSH, *Primary Examiner.*

P. GOODMAN, *Assistant Examiner.*